United States Patent
Haga (10) Patent No.: US 12,013,121 B2
(45) Date of Patent: Jun. 18, 2024

(54) EXHAUST GAS PURIFICATION DEVICE FOR GAS TURBINE ENGINE

(71) Applicant: HONDA MOTOR CO., LTD., Tokyo (JP)

(72) Inventor: Hisao Haga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/955,720

(22) Filed: Sep. 29, 2022

(65) Prior Publication Data

US 2023/0194098 A1     Jun. 22, 2023

(30) Foreign Application Priority Data

Dec. 21, 2021 (JP) .................. 2021-207461
Aug. 25, 2022 (JP) .................. 2022-133992

(51) Int. Cl.
| | |
|---|---|
| *F23R 3/40* | (2006.01) |
| *B01D 53/94* | (2006.01) |
| *B01J 31/02* | (2006.01) |
| *F01N 3/029* | (2006.01) |
| *F01N 3/20* | (2006.01) |

(Continued)

(52) U.S. Cl.
CPC ............ *F23R 3/40* (2013.01); *B01D 53/9418* (2013.01); *B01D 53/9495* (2013.01); *B01J 31/0237* (2013.01); *F01N 3/2006* (2013.01); *F01N 3/206* (2013.01); *F01N 3/2889* (2013.01); *F02C 3/30* (2013.01); *B01D 2255/70* (2013.01); *B01D 2257/40* (2013.01); *B01D 2258/01* (2013.01); *B01J 2231/60* (2013.01); *F01N 3/0296* (2013.01); *F01N 3/2066* (2013.01); *F01N 3/208* (2013.01); *F01N 2340/06* (2013.01); *F01N 2370/02* (2013.01); *F01N 2610/02* (2013.01); *F01N 2610/105* (2013.01); *F01N 2900/1621* (2013.01)

(58) Field of Classification Search
CPC .. B01D 53/565; B01D 53/58; B01D 53/9418; B01D 53/9495; B01D 2255/70; B01D 2257/40; B01D 2258/01; B01D 53/8631; B01D 53/9422; B01D 53/9431; B01D 53/9436; B01D 53/90; B01D 53/9409
See application file for complete search history.

(56) References Cited

U.S. PATENT DOCUMENTS

| | | | | |
|---|---|---|---|---|
| 5,809,775 A | * | 9/1998 | Tarabulski | .............. F01N 3/208 60/274 |
| 2004/0040288 A1 | * | 3/2004 | Jacob | ................. B01D 53/8631 60/301 |

(Continued)

FOREIGN PATENT DOCUMENTS

JP     2005023798 A     1/2005

*Primary Examiner* — Binh Q Tran
(74) *Attorney, Agent, or Firm* — Armstrong Teasdale LLP (57) ABSTRACT

An exhaust gas purification device (26) for a gas turbine engine (10) comprises a catalyst chamber (64, 96) defined in an exhaust gas passage (22), a reduction agent container (32) containing a solid material that releases a reduction agent gas effective for NOx reduction when heated, a heating device (36, 38) for heating the solid material contained in the reduction agent container, and a reduction agent gas supply passage (48) for supplying the reduction agent gas released from the solid material into the catalyst chamber.

9 Claims, 4 Drawing Sheets

(51) Int. Cl.
*F01N 3/28* (2006.01)
*F02C 3/30* (2006.01)

(56) References Cited

U.S. PATENT DOCUMENTS

| | | | | |
|---|---|---|---|---|
| 2010/0122526 | A1* | 5/2010 | VanderVeen | B01D 53/8696 60/297 |
| 2012/0036825 | A1* | 2/2012 | Kasuga | F23R 3/286 60/39.52 |
| 2012/0207657 | A1* | 8/2012 | Zhang | F01N 3/2066 422/186 |
| 2014/0096532 | A1* | 4/2014 | Broderick | F02C 6/18 60/774 |
| 2021/0404365 | A1* | 12/2021 | Volmerding | F01N 9/00 |

* cited by examiner

EXHAUST GAS PURIFICATION DEVICE FOR GAS TURBINE ENGINE

TECHNICAL FIELD

The present invention relates to an exhaust gas purification device for a gas turbine engine, and in particular to a device for reducing NOx in the exhaust gas.

BACKGROUND ART

According to a known exhaust gas purification device for reducing NOx in the exhaust gas discharged from a gas turbine engine, a reducing agent consisting of an organic compound in liquid form is drawn into the compressor to reduce NOx by a reduction reaction. See JP4080383B2, for example.

According to this prior art, since the organic compound for the reduction reaction is in liquid form (water solution), a relatively large container is required to store the organic compound. This undesirably increases the size and weight of the gas purification device for the gas turbine engine.

It is also known to use hydrogen gas as a reducing agent to reduce NOx in the exhaust gas. The hydrogen gas may be stored in hydrogen absorbing metals or carbon-based porous materials.

However, the hydrogen gas turns into water and is expended as the reduction reaction progresses so that a large amount of hydrogen gas is required to be supplied to the exhaust gas passage. Therefore, the size and weight of the gas purification device including the storage arrangement for the hydrogen gas are undesirable great. Also, the water produced from the reduction reaction evaporates due to the exhaust heat, and tends to promote the corrosion of metal parts of the exhaust system as it evaporates.

SUMMARY OF THE INVENTION

In view of such a problem of the prior art, a primary object of the present invention is to provide an exhaust gas purification device for a gas turbine engine using a reduction agent gas for NOx reduction which is small in size and light in weight.

To achieve such an object, the present invention provides an exhaust gas purification device (26) for a gas turbine engine (10), comprising: a catalyst chamber (64, 96) containing a reduction catalyst therein and defined in an exhaust gas passage (22) conducting exhaust gas discharged from the gas turbine engine; a reduction agent container (32) containing a solid material that releases a reduction agent gas effective for NOx reduction when heated; a heating device (36, 38) for heating the solid material contained in the reduction agent container; and a reduction agent gas supply passage (48) for supplying the reduction agent gas released from the solid material into the catalyst chamber.

Thereby, the size and weight of the supply source of the reduction agent gas effective for NOx reduction can be reduced.

Preferably, the reduction agent gas contains $NH_3$. $NH_3$ gas is effective in converting NOx into N2 and H2.

Preferably, the solid material contains a matrix retaining $NH_3$ therein or urea. The solid material may consist of any compound such as urea or a solid matrix retaining $NH_3$ therein so that NOx can be reduced in a stable manner.

Preferably, the exhaust gas purification device further comprises a hydrogen gas source (80) and a hydrogen gas supply passage (88) for supplying hydrogen gas from the hydrogen gas source into the catalyst chamber.

Thereby, the efficiency of NOx reduction is improved.

Preferably, the hydrogen gas source comprises hydrogen compound in solid form that releases hydrogen gas by adding water or heating.

Thereby, the size and weight of the hydrogen gas source can be reduced.

Preferably, the hydrogen compound includes a member selected from a group consisting of $MgH_2$ and $CaH_2$.

Thereby, the solid hydrogen compound can be stored in a stable manner, and can be released as required to improve the efficiency of NOx reduction.

Preferably, the gas turbine includes a regenerator for heating intake air with exhaust gas, and the catalyst chamber is provided in an exhaust gas flow path in the regenerator.

Thereby, the need to provide a dedicated container for defining the catalyst chamber can be eliminated.

Preferably, the heating device includes a heat exchanger (36) that exchanges heat between the solid material and a heat medium which acquires heat generated by operation of the gas turbine engine (10).

Thereby, the heat required for gasification of the solid material can be obtained without requiring a dedicated heat source.

Preferably, the heating device includes an electric heater (38) for heating the solid material, and a controller (56) for controlling an amount of heat supplied by the electric heater to the solid material.

Thereby, the amount of heat supplied to the solid material can be maintained at an optimum value at all times without regard to the operating condition of the gas turbine engine. In particular, during a startup of the gas turbine engine, the heating device can supply heat to the solid material until the gas turbine is warmed up to a sufficient extent for the gas turbine engine to supply the necessary heat to the solid material.

Preferably, the reduction agent container is provided with a pressure sensor (52) for detecting a pressure in the reduction agent container, and the exhaust gas purification device is provided with a controller (56) for controlling the heating device according to the pressure detected by the pressure sensor.

Thereby, the pressure in the container can be maintained at an appropriate value for supplying an optimum amount of the reduction agent gas to the exhaust passage.

The present invention thus provides an exhaust gas purification device for a gas turbine engine using a reduction agent gas for NOx reduction which is small in size and light in weight.

DESCRIPTION OF THE PREFERRED EMBODIMENT(S)

An exhaust purification device for a gas turbine engine according to an embodiment of the present invention will be described in the following with reference to FIG. 1.

First Embodiment

Figure 1:
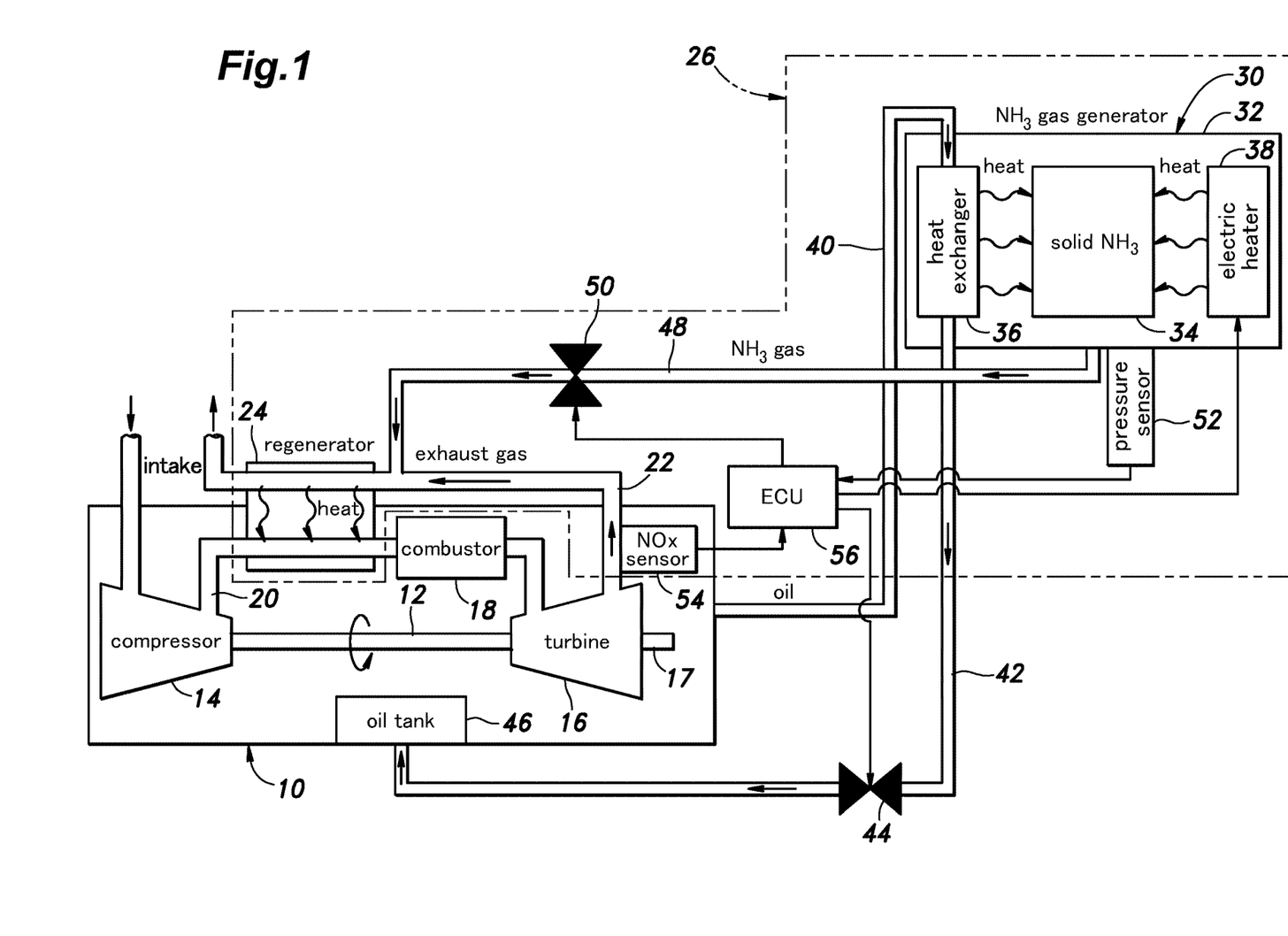
FIG. 1 is a schematic diagram showing an overall structure of a gas turbine engine fitted with an exhaust gas purification device according to a first embodiment of the present invention.

FIG. 1 shows a gas turbine engine 10 equipped with an exhaust gas purification device 26 according to the first embodiment of the present invention. The gas turbine engine 10 is provided with a compressor 14 and a turbine 16 coaxially connected to each other by a rotating shaft 12, and a combustor 18. The compressor 14 compresses and pressurizes intake air, and supplies the pressurized intake air to the combustor 18 via an air supply passage 20. High pressure combustion gas is produced in the combustor 18 by the combustion of a mixture of intake air and fuel which is injected into the combustor 18 via a passage not shown in the drawings. The combustion gas rotationally drives the turbine 16. An output shaft 17 of the turbine 16 is connected to a generator (not shown in the drawings) or the like as an object to be rotationally driven by the gas turbine engine 10.

The combustion gas that has rotationally driven the turbine 16 is discharged to the atmosphere via an exhaust gas passage 22 as exhaust gas.

The gas turbine engine 10 is additionally provided with a regenerator 24 positioned between intermediate parts of the air supply passage 20 and the exhaust gas passage 22. The regenerator 24 heats the supply air (intake air) flowing through the supply passage 20 with the heat of the exhaust gas flowing through the exhaust gas passage 22. Thus, the charge air supplied to the combustor 18 is preheated so that the thermal efficiency of the Brayton cycle performed by the gas turbine engine 10 can be improved.

The exhaust gas purification device 26 is provided with an $NH_3$ gas generator 30. The $NH_3$ gas generator 30 is provided with an $NH_3$ container 32 consisting of an enclosed container, and configured to accommodate a solid $NH_3$ cartridge 34 therein in a removable manner. The solid $NH_3$ cartridge 34 contains $NH_3$ (ammonia) in solid form typically as a solid organic compound or as gas or molecules absorbed/adsorbed in a solid storage medium or a solid matrix. Solid $NH_3$ may be maintained in a solid state such as powder, granules, and pellets, and is configured to release $NH_3$ gas when heated.

The $NH_3$ container 32 is internally provided with an electric heater 38 for heating the solid $NH_3$ contained in the solid $NH_3$ cartridge 34 as required.

The $NH_3$ container 32 is additionally provided with a heat exchanger 36 through which lubricating oil for lubricating various parts of the gas turbine engine 10 is circulated. The oil which has lubricated various parts of the gas turbine engine 10, and is thereby heated is supplied to the heat exchanger 36 via an oil introduction passage 40, and after releasing heat in the heat exchanger 36, is forwarded to an oil tank 46 of the gas turbine engine 10 via an oil discharge passage 42. The heat released by the heat exchanger 36 is used for heating the solid $NH_3$ contained in the solid $NH_3$ cartridge 34.

The oil discharge passage 42 is provided with an oil flow control valve 44 which allows the flow of the oil into and out of the heat exchanger 36 to be quantitatively controlled.

When the solid $NH_3$ in the solid $NH_3$ cartridge 34 is heated by the heat exchanger 36 or the electric heater 38, $NH_3$ gas is generated in the $NH_3$ container 32 by sublimation or other forms of gasification of the solid $NH_3$.

The interior of the $NH_3$ container 32 is communicated with a part of the exhaust gas passage 22 upstream of the regenerator 24 via an $NH_3$ gas supply passage 48 so that the $NH_3$ gas generated in the $NH_3$ container 32 may be supplied to the part of the exhaust gas passage 22 upstream of the regenerator 24 via the $NH_3$ gas supply passage 48. An $NH_3$ gas flow rate control valve 50 is provided in the $NH_3$ gas supply passage 48. The $NH_3$ gas flow rate control valve 50 quantitatively controls the flow rate of the $NH_3$ gas flowing through the $NH_3$ gas supply passage 48 or, in other words, the amount of $NH_3$ gas supplied to the exhaust gas passage 22.

The $NH_3$ container 32A is provided with a pressure sensor 52 for detecting the internal pressure of the $NH_3$ container 32. A NOx sensor 54 for detecting the concentration of NOx flowing through the exhaust gas passage 22 is provided in a part of the exhaust gas passage 22 upstream of the junction with the $NH_3$ gas supply passage 48.

The exhaust gas purification device 26 is provided with an electronic control unit (ECU) 56 that controls the electric heater 38, the oil flow control valve 44 and the $NH_3$ gas flow rate control valve 50.

The ECU 56 controls the heating of the solid $NH_3$ in the solid $NH_3$ cartridge 34 by using the heat obtained from the heat exchanger 36 and the electric heater 38 according to the internal pressure of the $NH_3$ container 32 detected by the pressure sensor 52. The ECU 56 controls the $NH_3$ gas flow rate control valve 50 according to the NOx concentration detected by the NOx sensor 54 so that the amount of $NH_3$ gas supplied to the exhaust gas passage 22 is maintained at an optimum value as will be described hereinafter. The amount of NOx emission may also be estimated from the operating state of the gas turbine engine 10 instead of actually measuring the amount of NOx emission with the NOx sensor 54, and the $NH_3$ gas supply amount may be determined based on this data.

The internal pressure of the $NH_3$ container 32 can be increased by the $NH_3$ gas produced by the sublimation or other modes of gasification of the solid $NH_3$, and the internal pressure can be maintained at a designed value by the heat from the heat exchanger 36 and the electric heater 38 which is under the control of the ECU 56. Thus, the supply of $NH_3$ gas can be performed without requiring a pump or the like. As a result, the cost of the exhaust gas purification device 26 can be reduced, and the space efficiency of the exhaust gas purification device 26 can be improved. By maintaining the pressure in the $NH_3$ container 32 at a prescribed value, the quantitative control of the amount of $NH_3$ gas supplied to the exhaust gas passage 22 by means of the $NH_3$ gas flow rate control valve 50 is facilitated.

The ECU 56 turns on the electric heater 38 when the oil temperature falls short of the prescribed value only with the heat generated by the operation of the gas turbine engine 10. Typically, the electric heater 38 is turned on during the warm-up period of the gas turbine engine 10, and is kept turned on until the oil temperature has reached or exceeded the prescribed value. Therefore, even during the warm-up period following the initial starting of the gas turbine engine 10, the necessary amount of $NH_3$ gas can be ensured by heating the solid $NH_3$ cartridge 34 with the electric heater 38.

Normally, the electric heater 38 is required to be operated only for a short period of time immediately following the startup of the gas turbine engine 10 or until the oil of the gas turbine engine 10 reaches the temperature required for the gasification of the $NH_3$ solid matter in the solid $NH_3$ cartridge 34. Since this period is relatively short, even in the case of aircraft or the like using a gas turbine engine 10 as a power source, the existing onboard battery will be adequate as a power source for the electric heater 38, and no additional cost will be incurred.

Figure 2:
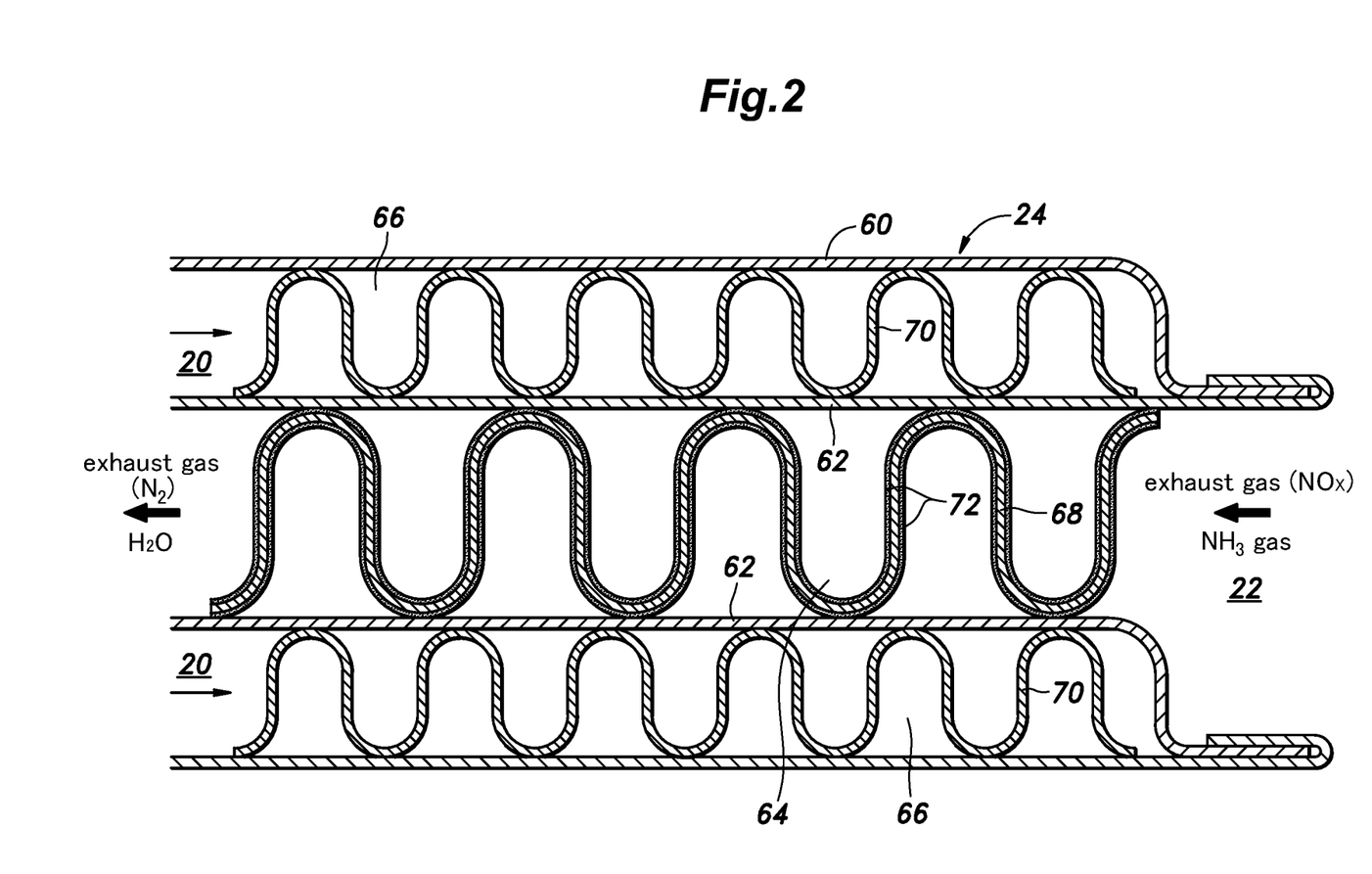
FIG. 2 is a sectional side view of a regenerator used in the exhaust gas purification device of the first embodiment.

As shown in FIG. 2, the regenerator 24 is provided with a regenerator housing 60 which is internally partitioned by a partition wall 62 between an exhaust gas channel 64 and an air supply channel 66. The exhaust gas channel 64 forms a part of the exhaust gas passage 22, and the air supply channel 66 forms a part of the air supply passage 20. Corrugated fins 68 and 70 are provided in the exhaust gas channel 64 and the air supply channel 66, respectively. These fins 68 and 70 are in contact with and/or attached to the adjoining walls of the housing 60 and the partition wall 62. The fins 68 and 70, the housing 60 and the partition wall 62 are all made of thermally conductive metal sheet members. Owing to the large surface areas provided by the corrugated or otherwise wavy configuration of the fins 68 and 70, heat exchange between the intake air flowing through the air supply channel 66 and the exhaust gas flowing through the exhaust gas channel 64 can be effected in an efficient manner.

A reduction catalyst layer 72 is formed on the surface of the fins 68 in the exhaust gas channel 64 so that the exhaust gas channel 64 forms a catalyst chamber. The catalyst material for the reduction catalyst layer 72 may be zeolite, which increases the efficiency of the NOx reduction reaction by $NH_3$. The exhaust gas into which $NH_3$ gas is supplied from the $NH_3$ container 32 flows inside the exhaust gas channel 64. As a result, NOx in the exhaust gas is reduced under the catalytic action of the reduction catalyst layer 72 using the $NH_3$ gas as a reducing agent. This reduction reaction can be representative by the following chemical formulas.

$$NO+NO_2+2NH_3 \rightarrow 2N_2+3H_2O$$

$$4NO+4NH_3+O_2 \rightarrow 4N_2+6H_2O$$

$$6NO_2+8NH_3 \rightarrow 7N_2+12H_2O$$

In this way, the NOx in the exhaust gas is reduced and the exhaust gas is purified. In this reduction process, it is desirable that the amount of $NH_3$ that is supplied corresponds to the flow rate of the exhaust gas and the concentration of NOx gas in the exhaust gas. In this embodiment, $NH_3$ is obtained by the sublimation or gasification of $NH_3$ in the solid $NH_3$ cartridge 34, so the volume and weight of the $NH_3$ supply source are minimized as compared to the case where $NH_3$ is supplied as water solution of urea. As a result, the size and weight of the exhaust gas purification device 26 including the $NH_3$ gas generator 30 can be reduced. In particular, since the $NH_3$ supply source for the reduction process is in solid form, the storage space for the necessary amount of $NH_3$ can be made smaller than when the $NH_3$ supply source is in liquid form.

When the $NH_3$ supply source is in liquid form such as water solution of urea, a leak-proof tank is required, but when the $NH_3$ supply source is the solid $NH_3$ cartridge 34, there is no risk of liquid leakage. When the $NH_3$ supply source is in liquid form such as water solution of urea, a relatively large tank is required, and the sloshing of the liquid in the tank may also pose a problem in automobiles and aircraft. Further, since the $NH_3$ supply source stored in the solid $NH_3$ cartridge 34 is in solid form, the $NH_3$ supply source NH is stable against external influences, and is easy to handle during the maintenance work such as replacing the cartridge.

The heat exchanger 36 heats the solid $NH_3$ cartridge 34 by using the heat generated by the operation of the gas turbine engine 10 during the normal operation of the gas turbine engine 10 so that there is no need to separately prepare a heat source for gasification. As a result, the cost of the exhaust gas purification device can be reduced.

According to the first embodiment, a significant reduction in the size of the reducing agent storage unit can be accomplished owing to the use $NH_3$ in solid form as compared to the case where hydrogen gas is used.

By providing the reduction catalyst layer 72 in the regenerator 24, there is no need to provide a separate housing to form the catalyst chamber. This also contributes to size and weight reduction of the exhaust gas purification device 26. Since the reduction catalyst layer 72 is formed on the surface of the fins 68 of the regenerator 24, the surface area of the reduction catalyst layer 72 can be maximized. Thus, owing to the effective use of the fins 68 of the regenerator 24, the surface area of the reduction catalyst layer 72 is increased. This improves the catalytic action of the reduction catalyst layer 72.

Second Embodiment

Figure 3:
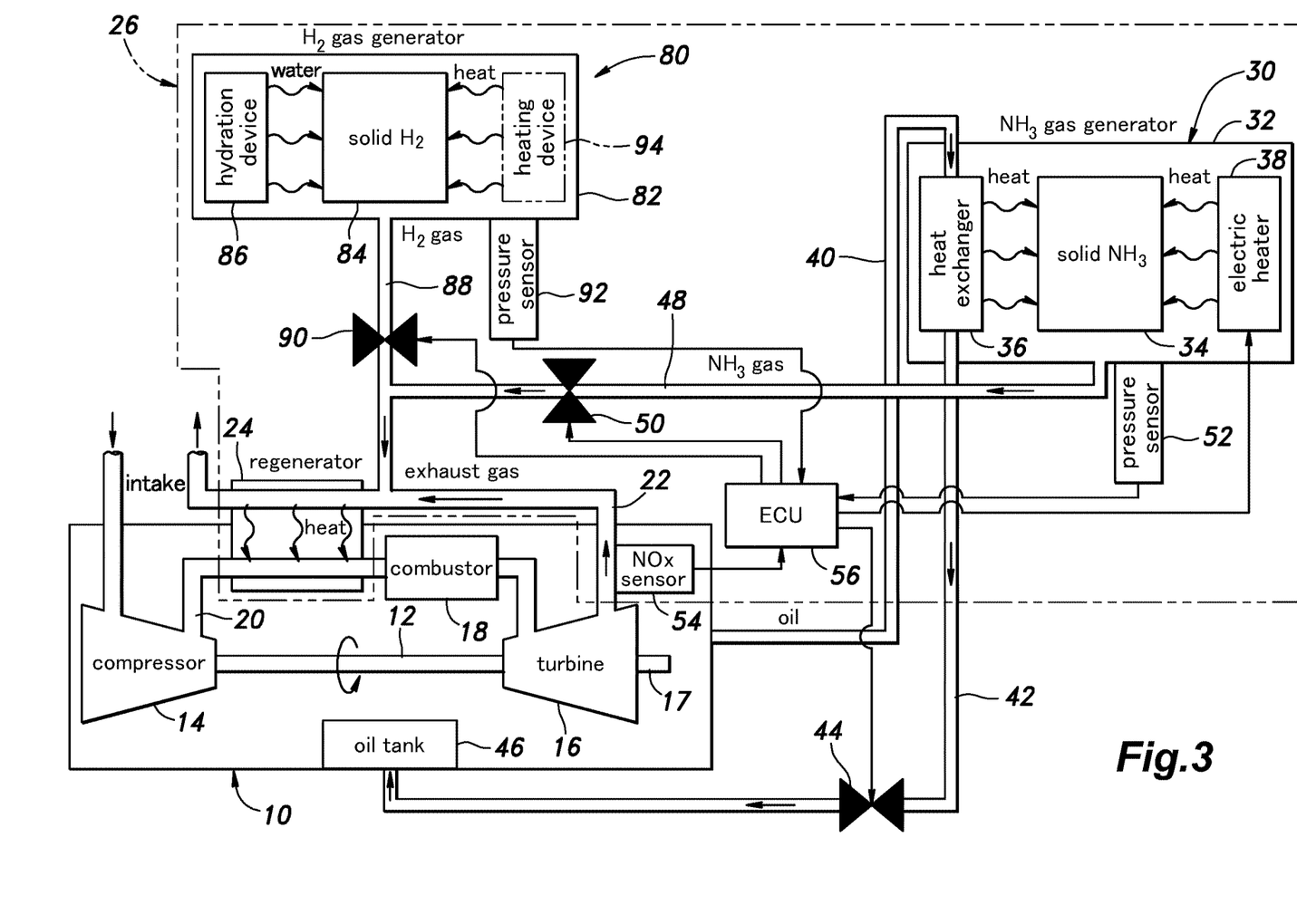
FIG. 3 is a view similar to FIG. 1 showing a second embodiment of the present invention.

An exhaust gas purification device 26 according to a second embodiment of the present invention will be described in the following with reference to FIG. 3. In FIG. 3, parts corresponding to those in FIG. 1 are denoted with like numerals as in FIG. 1, and the description of such parts may be omitted in the following description to avoid redundancy.

The exhaust gas purification device 26 according to the second embodiment is provided with an $H_2$ gas generator 80 in addition to the $NH_3$ gas generator 30.

The $H_2$ gas generator 80 is provided with a hydrogen compound container 82 having an enclosed structure. The hydrogen compound container 82 accommodates a solid $H_2$ cartridge 84 in a removable manner. The solid $H_2$ cartridge 84 contains $MgH_2$ (magnesium hydride) as a solid hydrogen compound. $MgH_2$ is stable in a solid state such as powder, granules, or pellets.

The hydrogen compound container 82 is provided with a hydration device 86 that hydrolyzes the solid $MgH_2$ stored in the solid $H_2$ cartridge 84.

The $MgH_2$ in the solid $H_2$ cartridge 84 releases $H_2$ gas as a result of hydrolysis performed in the hydration device 86.

The hydrogen compound container 82 is connected to a part of the $NH_3$ gas supply passage 48 downstream of the $NH_3$ gas flow rate control valve 50 via a hydrogen gas supply passage 88. Thus, the $H_2$ gas generated in the hydrogen compound container 82 is forwarded to the part of the exhaust gas passage 22 upstream of the regenerator 24 together with the $NH_3$ gas. The hydrogen gas supply passage 88 may also be directly connected to a part of the $NH_3$ gas supply passage 48 upstream of the regenerator 24.

An $H_2$ gas flow rate control valve 90 is provided in an intermediate part of the hydrogen gas supply passage 88. The $H_2$ gas flow rate control valve 90 quantitatively controls the flow rate of $H_2$ gas flowing through the hydrogen gas supply passage 88, or in other words, the amount of $H_2$ gas supplied to the exhaust gas passage 22.

The hydrogen compound container 82 is provided with a pressure sensor 52 for detecting the pressure inside the hydrogen compound container 82.

The ECU 56 controls the progress of the hydrolysis of $MgH_2$ in the solid $H_2$ cartridge 84 performed by the hydration device 86 according to the pressure inside the hydrogen compound container 82 detected by the pressure sensor 52. The ECU 56 controls the $H_2$ gas flow rate control valve 90 so that the amount of $H_2$ gas supplied to the exhaust gas passage 22 is maintained at a prescribed value. The $H_2$ gas flow rate control valve 90 is controlled in relation with the control of the $NH_3$ gas flow rate control valve 50 so that the amount of $H_2$ gas supplied to the exhaust gas passage 22 is at a prescribed ratio to the amount of $NH_3$ gas supplied to the exhaust gas passage 22.

The pressure inside the hydrogen compound container 82 increases as the $H_2$ gas produced in the hydration device 86 increases so that the $H_2$ gas can be supplied from the hydrogen compound container 82 to the exhaust gas passage 22 in a controllable manner and without requiring a pump or the like. This also contributes to the reduction in the size and cost of the exhaust gas purification device 26. By maintaining the pressure in the hydrogen compound container 82 at a prescribed value, the quantitative control the amount of $H_2$ gas supplied to the exhaust gas passage 22 via the $H_2$ gas flow rate control valve 90 is facilitated.

The reduction catalyst layer 72 (see FIG. 2) provided in the regenerator 24 may contain silver alumina ($Ag/Al_2O_3$) in the second embodiment. The activity of silver-alumina for NOx reduction by $NH_3$ gas is enhanced by the addition of $H_2$ gas. More specifically, the addition of $H_2$ gas generates Ag clusters and $O_2$, and a mechanism for promoting NOx reduction using these as free radicals is created. This improves the NOx reduction rate in the exhaust gas.

Since $H_2$ gas is obtained from solid $MgH_2$, the volume and weight of the $H_2$ source can be reduced. As a result, the size and weight of the exhaust gas purification device 26 including the $H_2$ gas generator 80 can be reduced. In other words, since the $H_2$ gas supply source is in solid form, the installation space for the container of the $H_2$ gas supply source can be reduced compared to the case where the $H_2$ gas supply source is in gas form.

The present invention has been described in terms of specific embodiments thereof, but is not limited by such embodiments, and can be modified in various ways without departing from the scope of the present invention. Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

For example, the solid material that releases a reduction agent gas effective for NOx reduction is not limited to $NH_3$ retained in a solid material or solid matrix, but any solid compound that can exist in solid form such as $CH_4N_2O$ (urea) may also be used for NOx reduction according to the present invention. Similarly as the solid material retaining $NH_3$, $CH_4N_2O$ can also maintain a solid state such as powder, granules, and pellets.

Solid hydrogen compounds suitable for generating $H_2$ gas include $CaH_2$ (calcium hydride) in addition to $MgH_2$. Similarly as $MgH_2$, $CaH_2$ can also maintain a solid state such as powder, granules, and pellets. Since $CaH_2$ generates $H_2$ gas when heated, the hydrogen compound container 82 may be provided with a heating device (such as the heating device 94 shown in FIG. 3) in place of the hydration device 86. The $H_2$ gas may also be fed to an upstream part of the exhaust gas passage 22 or the exhaust gas channel 64 of the regenerator 24, instead of an intermediate part of the $NH_3$ gas supply passage 48. The heating device 94 may be a combination of a heat exchanger 36 and an electric heater 38 similar to the counterparts provided in the $NH_3$ gas generator 30 of the first embodiment.

Figure 4:
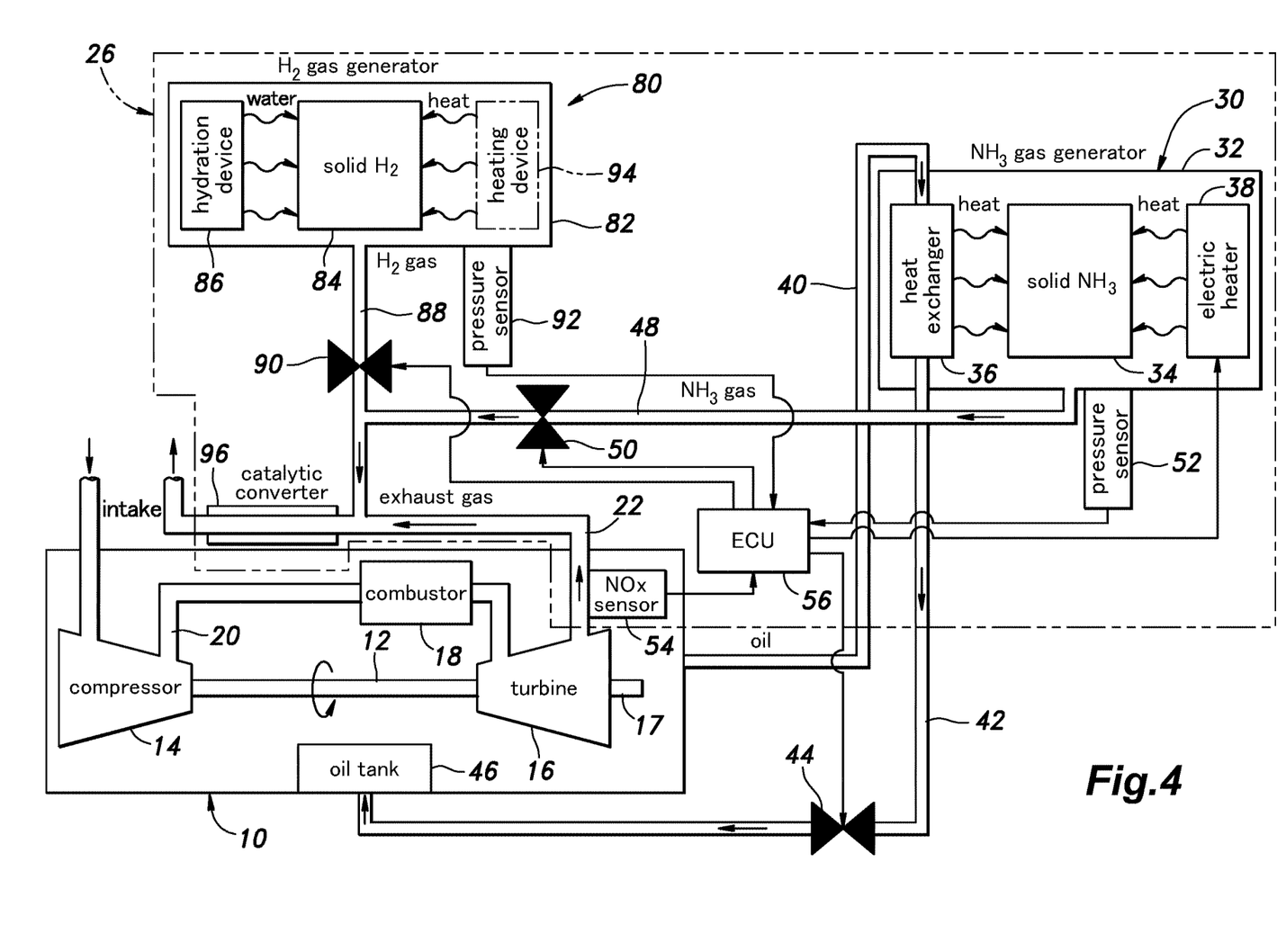
FIG. 4 is a view similar to FIG. 1 showing a third embodiment of the present invention.

The regenerator 24 is optional for the present invention, and as shown in FIG. 4, the regenerator 24 may be replaced by a catalytic converter 96 defining a catalytic chamber therein, and provided separately from the air supply passage 20. In the case of the catalytic converter 96, a honeycomb structure containing a catalyst through which the exhaust gas flows may be used.

The invention claimed is:

1. An exhaust gas purification device for a gas turbine engine, comprising:
   a catalyst chamber containing a reduction catalyst therein and defined in an exhaust gas passage conducting exhaust gas discharged from the gas turbine engine;
   a reduction agent container containing a solid material that releases a reduction agent gas effective for NOx reduction when heated;
   a heating device for heating the solid material contained in the reduction agent container; and
   a reduction agent gas supply passage for supplying the reduction agent gas released from the solid material into the catalyst chamber,
   wherein the exhaust gas purification device further comprises a hydrogen gas source and a hydrogen gas supply passage for supplying hydrogen gas from the hydrogen gas source into the catalyst chamber, and
   the hydrogen gas source comprises hydrogen compound in solid form that releases hydrogen gas by adding water or heating.

2. The exhaust gas purification device according to claim 1, wherein the reduction agent gas contains $NH_3$.

3. The exhaust gas purification device according to claim 2, wherein the solid material contains a matrix retaining $NH_3$ therein or urea.

4. The exhaust gas purification device according to claim 1, wherein the hydrogen compound includes a member selected from a group consisting of $MgH_2$ and $CaH_2$.

5. An exhaust gas purification device for a gas turbine engine, comprising:
   a catalyst chamber containing a reduction catalyst therein and defined in an exhaust gas passage conducting exhaust gas discharged from the gas turbine engine;
   a reduction agent container containing a solid material that releases a reduction agent gas effective for NOx reduction when heated;
   a heating device for heating the solid material contained in the reduction agent container; and
   a reduction agent gas supply passage for supplying the reduction agent gas released from the solid material into the catalyst chamber,
   wherein the gas turbine engine includes a regenerator for heating intake air of the gas turbine engine with exhaust gas, and the catalyst chamber is provided in an exhaust gas flow path in the regenerator.

6. The exhaust gas purification device according to claim 1, wherein the heating device includes a heat exchanger that exchanges heat between the solid material and a heat medium which acquires heat generated by operation of the gas turbine engine.

7. The exhaust gas purification device according to claim 1, wherein the heating device includes an electric heater for heating the solid material, and the electric heater is provided with a controller for controlling an amount of heat supplied to the solid material.

8. The exhaust gas purification device according to claim 6, wherein the heating device includes an electric heater for heating the solid material, and a controller for controlling an amount of heat supplied by the electric heater to the solid material.

9. The exhaust gas purification device according to claim 1, wherein the reduction agent container is provided with a pressure sensor for detecting a pressure in the reduction agent container, and the exhaust gas purification device is provided with a controller for controlling the heating device according to the pressure detected by the pressure sensor.

* * * * *